Jan. 19, 1943. W. C. SKAREEN 2,308,899
MECHANISM CONTROL
Filed Feb. 27, 1942 3 Sheets-Sheet 1

INVENTOR
Willard C. Skareen
BY
Braselton, Whitcomb Davies

Jan. 19, 1943.  W. C. SKAREEN  2,308,899
MECHANISM CONTROL
Filed Feb. 27, 1942  3 Sheets-Sheet 2

INVENTOR
*Willard C. Skareen*
BY
*Braselton, Whitcomb & Davies*

Jan. 19, 1943.   W. C. SKAREEN   2,308,899
MECHANISM CONTROL
Filed Feb. 27, 1942   3 Sheets-Sheet 3
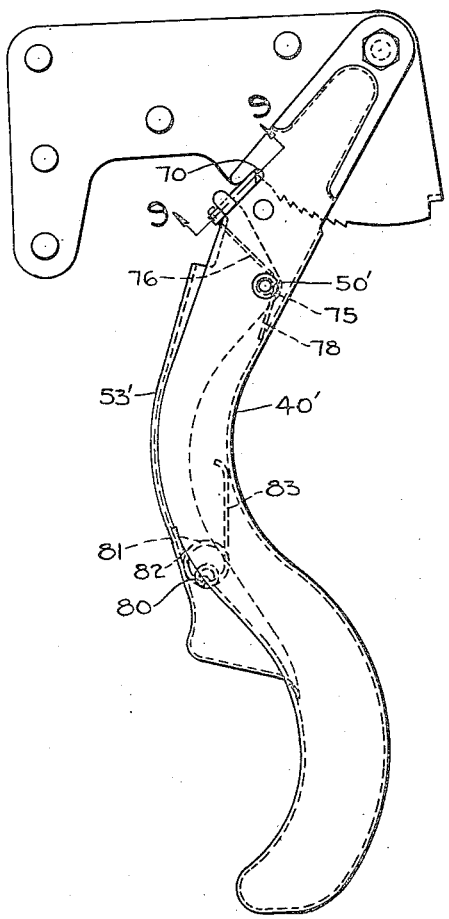
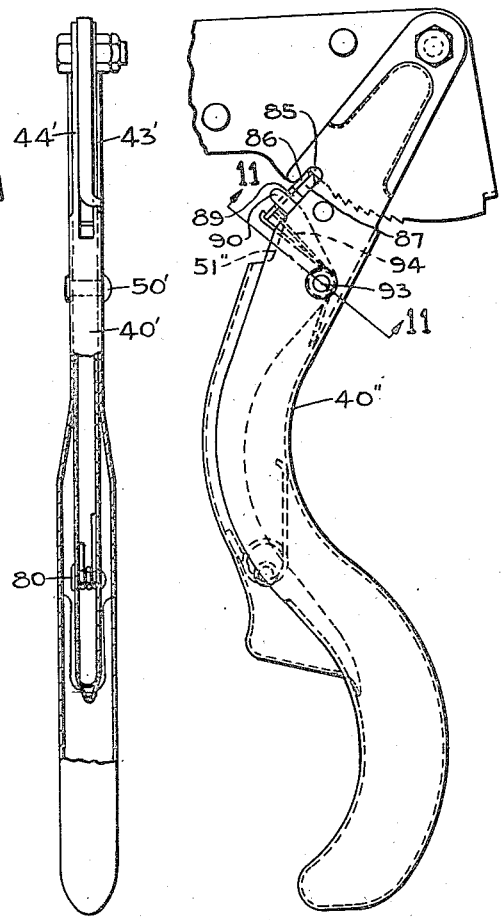
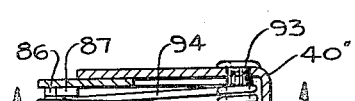
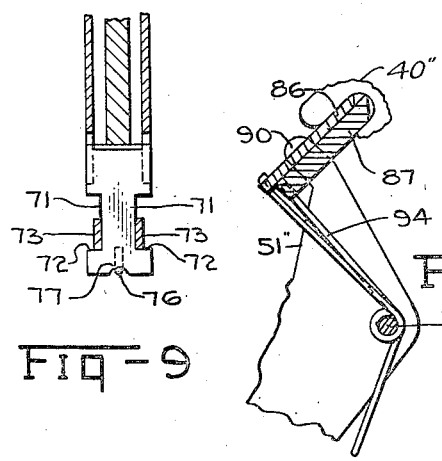
INVENTOR
Willard C. Skareen
BY
Braselton, Whitcomb Davies Patented Jan. 19, 1943

2,308,899

UNITED STATES PATENT OFFICE 2,308,899

MECHANISM CONTROL

Willard C. Skareen, Toledo, Ohio, assignor to The Bingham Stamping Company, Toledo, Ohio, a corporation of Ohio Application February 27, 1942, Serial No. 432,678

4 Claims. (Cl. 74—538)

This invention relates to control mechanism and more particularly to a lever mechanism of a type especially adapted for controlling the brakes of an automotive vehicle or other similar apparatus.

The invention embraces the provision of a mechanism embodying a slidable clutch means cooperating with a clutching surface of a support whereby the mechanism may be effectively held in adjusted positions.

An object of the invention is the provision of a lever mechanism incorporating a slidable pawl mechanism for retaining a lever in adjusted position in combination with simple yet effective releasing means for the pawl mechanism.

Another object of the invention resides in a multiple pawl lever retaining means cooperating with a serrated clutching surface whereby the number of adjusted positions in which the lever may be retained is increased without decreasing the spacing between or size of the teeth in the serrated clutching surface.

A further object is the provision of an emergency brake control lever arrangement adapted for mounting at the rear of the instrument panel of a vehicle in a convenient position to be manipulated and capable of being adjusted to a large number of brake setting positions to effectively "set" the vehicle brakes without undue force being used.

Still another object resides in lever and slidable pawl arrangement which is inexpensive to manufacture and in which many of the component elements are formed from sheet metal so as to facilitate the interchangeability of parts as well as quantity production.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 7 is a view similar to Figure 2 showing a modified form of the invention;

Figure 8 is a front view of the arrangement shown in Figure 7 with portions of the mechanism shown in section;

Figure 9 is an enlarged sectional view taken substantially on the line 9—9 of Figure 7;

Figure 10 is an elevational view illustrating another modification of the invention;

Figure 11 is a detail sectional view taken substantially on the line 11—11 of Figure 10;

Figure 12 is a fragmentary detail sectional view taken substantially on the line 12—12 of Figure 11.

While I have shown the arrangement of control mechanism of my invention as utilized for actuating the emergency brakes of an automotive vehicle, it is to be understood that I contemplate the use of the arrangement with any apparatus where the same may be found to have utility.

Figure 1:
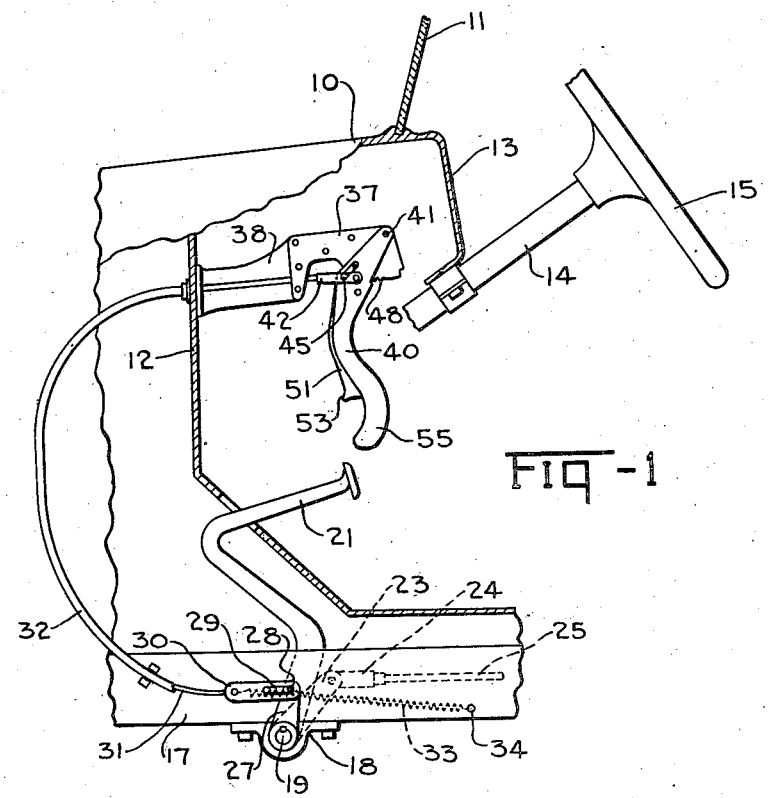
Figure 1 is a fragmentary side elevational view of a portion of the vehicle operator's compartment, parts being broken away to illustrate the mounting of the mechanism control of my invention.
Figure 4:
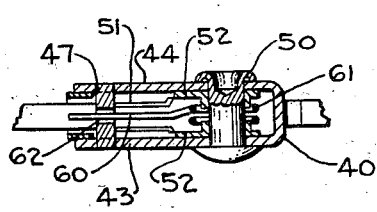
Figure 4 is an enlarged sectional view taken substantially on the line 4—4 of Figure 2.

Referring to the drawings in detail, and first to Figure 1 there is illustrated a portion of an operator's compartment of a vehicle wherein numeral 10 designates the cowl portion, 11 the windshield, 12 the dashboard of the vehicle, 13 the conventional instrument panel, a steering post 14 and steering wheel 15. A part of the vehicle supporting frame or chassis is shown at 17, the same supporting a bracket 18 upon which is journalled a transversely extending shaft 19. Keyed or otherwise secured to the shaft 19 is a service brake pedal 21. Also keyed to the shaft 19 is an arm 23 connected by means of a clevis 24 and a rod 25 to the vehicle brake mechanism (not shown). Also secured on shaft 19 is a second arm 27 having a pin 28 at its end which projects into a slot 29 in a member 30, the latter being secured at one end to a flexible cable 31 which is slidably supported within a sheath or guide 32. A spring 33 has one end connected as at 34 to the frame 17 and the other end secured to member 30.

The arrangement of my invention as shown in Figures 1 through 6 is inclusive of a support 37 suitably secured to a bracket 38 which is carried by the dashboard 12 or other suitable portion of the vehicle. A lever or member 40 is movably mounted upon the support 37 as, for example, by means of the bolt or shaft 41, the latter passing through openings in wall portions 43 and 44 which straddle the support 37. The brake cable 31 is connected to the lever member 40 by means of a clevis 42 and a pin or rivet 45 passing through aligned openings 49 in the lever member and clevis. The side walls 43 and 44 are provided with aligned slots 46 within which is positioned a locking plate or pawl 47 arranged for sliding movement in the slots 46. The support is provided with a serrated or toothed portion 48 with which the slidable pawl 47 cooperates to retain the member 40 in adjusted position.

Pivotally secured to the lever member 40 by means of a rivet 50 is a pawl or locking plate releasing element 51 which is preferably formed of sheet metal of U-shaped cross section with the side walls 52 thereof extending within the side walls of member 40. The locking plate releasing element 51 is formed at its lower end with a finger piece 53. The depending extremity of the lever member is formed into a closed hollow handle or grip portion 55 which may be grasped by the operator for actuating the lever. The lower edge portion of the clutch releasing member 51 terminates in portion 56 arranged to engage the inner rear wall of the grip portion acting as a stop to limit the outermost movement of the clutch releasing member.

Figure 5:
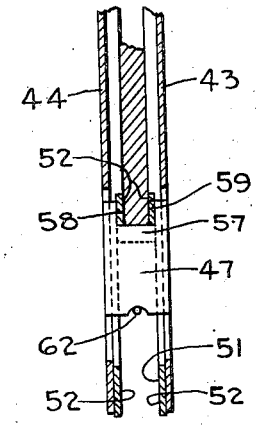
Figure 5 is an enlarged sectional view taken substantially on the line 5—5 of Figure 2.
Figure 2:
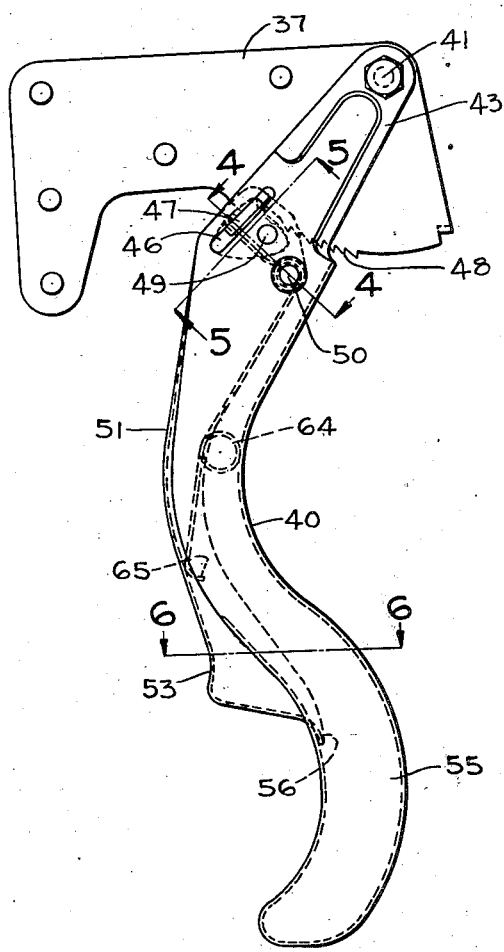
Figure 2 is a side elevational view of the lever arrangement of my invention.
Figure 3:
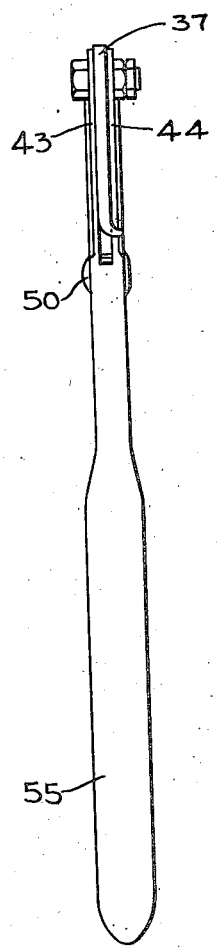
Figure 3 is a front view of the arrangement shown in Figure 2.
Figure 6:
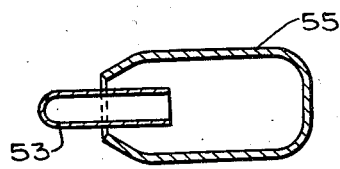
Figure 6 is an enlarged sectional view taken substantially on the line 6—6 of Figure 2.

The upper portion of the pawl plate 47 is notched as shown in Figure 5 to form a tooth 57 for engagement with the teeth 48 on the support, and guide portions or walls 58 and 59 to receive and accommodate portions of the walls 52 of the member 51. Resilient or spring means 60 are provided for urging the clutch or plate 47 toward the serrated portion 48 and the clutch or pawl releasing member 51 to its outermost position as illustrated in Figure 2. In this embodiment of the invention the spring has an intermediate portion 61 surrounding the rivet 50 with one end 62 projecting beneath the plate and engaging in a notch 63 formed therein, the other leg of the spring being formed with a coil 64 which contacts the lever member, the extreme end of the spring 65 contacting the clutch releasing member 51 as shown in Figure 2. Thus by means of a single spring the pawl 47 is urged into proper clutch engaging position and the member 51 urged away from the lever member thus preventing rattling of the parts.

In the arrangement illustrated in Figures 7 to 9, the side walls 43' and 44' of the lever member 40' are formed with aligned open slots to slidably receive the clutch or pawl plate 70. As shown in Figure 9, the plate 70 is formed with laterally opposed notches or recesses 71 which form ledges 72. The side walls of the clutch releasing member 53' are cut away to form projections 73 which extend into the notches or recesses 71 and in engagement with the ledges 72. The clutch releasing member 53' is pivotally connected to the lever member by means of rivet 50'. Surrounding the rivet is the central portion of a coil spring 75, one leg 76 of the spring extending beneath the pawl plate 70 and fitting into a recess 77 formed in the lower edge of the plate, the other leg 78 of the spring contacting the inner wall of the bight portion of the lever member. By this means the pawl or clutch 70 is at all times resiliently urged toward the serrated portion 48' of the support 37. As the length of the recesses 71 is greater than the width of the projections 73 on the clutch releasing member, the pawl plate 70 may over-ride the teeth of the serrated portion without effecting relative movement of the clutch releasing member.

Adjacent the finger portion 53' of the clutch releasing member 51' is provided with a rivet 80 which supports the central portion of a coil spring 81, one leg 82 of the spring contacting the interior wall of the clutch releasing member, the other leg of the spring 83 contacting the interior wall of the lever member. The spring 81 serves to urge the clutch releasing member to its outermost position as shown in Figure 7.

In the arrangement shown in Figures 10, 11 and 12, the side walls of member 51'' are formed with open slots 85 to receive a pair of clutches or pawl plates 86 and 87 arranged in slidable parallel relationship. The edges of the slots in the lever member serve to guide the plates into proper relationship with the serrated portion 48'' of the support 37''. The plates 86 and 87 are provided with recesses or notches 89 which receive projections 90 formed from the side walls of the clutch releasing member 51''. The pawl plates 86 and 87 are resiliently urged into engagement with the clutching surface 48'' by means of a spring 91 contained within the clutch releasing member having a coiled portion 92 surrounding a rivet 93 the latter serving to position the spring. One leg 94 of the spring is positioned beneath plate 87 and the other leg 95 positioned beneath plate 86, the end of leg 95 being bent upwardly as shown in Figure 12. The spring is formed with an intermediate bight portion 96 which contacts the interior wall of the lever member thus placing a tension on the spring to urge the pawls 86 and 87 upwardly.

The pawl plate 86 is substantially one half as thick as plate 87 and as both plates are urged toward the serrated clutching surface 48'', either pawl plate may engage the teeth of surface 48'' to hold the lever 40'' in adjusted position. By this arrangement teeth 48'' may be of comparatively large size yet the number of positions in which the lever may be retained is double the number of teeth in the clutching surface 48''.

The use of the slidable pawl arrangements of the present invention facilitates the assembly of the mechanism and the replacements of worn pawls as they may be quickly and easily removed and new pawls inserted by simply withdrawing the clevis pin to move the clevis out of its normal position to permit access to the pawls.

It is apparent that, within the scope of the invention, modifications and different arrangements may be made other than is herein disclosed, and the present disclosure is illustrative merely, the invention comprehending all variations thereof.

What I claim is:

1. In combination, a support having a serrated surface, a member movably carried by said support, a pair of locking plates slidably carried by said member, said locking plates being arranged for engagement with the serrated surface of said support to retain said member in adjusted position, spring means for normally urging said locking plates into engagement with the serrated surface, an element pivotally supported on said member, said element having projections formed thereon arranged to engage and withdraw said locking plates from said serrated surface upon relative movement of said element with respect to said member.

2. In combination, a support having a serrated surface, a member movably mounted on said support, a pair of locking plates slidably carried by said member; the thickness of one of said plates being substantially double that of the other of said plates, said locking plates being arranged for engagement with the serrated surface of said support to retain said member in adjusted position, spring means for normally urging said locking plates into engagement with the serrated surface, an element supported on said member, said element having a portion arranged to engage and withdraw said locking plates from said serrated surface upon relative movement of said element with respect to said member.

3. In combination, a support having a serrated surface, a member movably mounted on said support, a pair of locking plates slidably carried by said member; one of said plates being substantially thicker than the other of said plates, said locking plates being in slidable contact and arranged for independent engagement with the serrated surface of said support to retain said member in adjusted position, spring means for normally urging said locking plates into engagement with the serrated surface, an element pivotally supported on said member, said element having a portion arranged to engage and withdraw said locking plates from said serrated surface upon relative movement of said element with respect to said member.

4. A mechanism control including, in combination, a supporting member having a clutching surface, a hollow lever member formed of sheet metal having a portion pivotally connected to said supporting member; a pair of clutch members each formed of different thickness and length adapted for independent cooperation with the clutching surface of said supporting members; resilient means contacting said lever member and said clutch members and urging the same into engagement with the clutching surface of said supporting member; a clutch actuating member positioned within said lever member and pivotally supported thereby; resilient means interposed between said clutch actuating member and said lever for normally urging said clutch actuating member into disengaged position; said clutch actuating member arranged to release said clutch members from engagement with the toothed portion of said supporting member.

WILLARD C. SKAREEN.